United States Patent
Adkins et al.

(10) Patent No.: US 8,225,021 B2
(45) Date of Patent: Jul. 17, 2012

(54) DYNAMIC ADDRESS CHANGE FOR SLAVE DEVICES ON A SHARED BUS

(75) Inventors: Christopher Alan Adkins, Lexington, KY (US); Donald William Chapelle, Versailles, KY (US); Zachary Nathan Fister, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 284 days.

(21) Appl. No.: 12/474,052

(22) Filed: May 28, 2009

(65) Prior Publication Data
US 2010/0306431 A1  Dec. 2, 2010

(51) Int. Cl.
*G06F 13/00* (2006.01)
(52) U.S. Cl. ............................... 710/110; 710/9
(58) Field of Classification Search .............. 710/9, 104, 710/110
See application file for complete search history.

(56) References Cited

U.S. PATENT DOCUMENTS

| | | | | |
|---|---|---|---|---|
| 5,636,342 A * | 6/1997 | Jeffries | ............................ | 714/48 |
| 5,708,831 A * | 1/1998 | Schon | ............................ | 709/245 |
| 6,629,172 B1 * | 9/2003 | Andersson et al. | ............ | 710/104 |
| 6,745,270 B1 * | 6/2004 | Barenys et al. | ............... | 710/104 |
| 6,751,682 B1 * | 6/2004 | Stirling | ............................ | 710/9 |
| 6,823,400 B2 * | 11/2004 | Namba | ............................ | 710/9 |
| 7,085,863 B2 * | 8/2006 | Barenys et al. | ............... | 710/104 |
| 7,587,539 B2 * | 9/2009 | Picard et al. | .................. | 710/104 |
| 2006/0259673 A1 | 11/2006 | Bancel et al. | | |
| 2007/0083491 A1 | 4/2007 | Walmsley et al. | | |
| 2007/0236726 A1 * | 10/2007 | Robb et al. | ................... | 358/1.15 |
| 2008/0147941 A1 | 6/2008 | Deshpande et al. | | |
| 2008/0186367 A1 | 8/2008 | Adkins et al. | | |
| 2008/0301344 A1 * | 12/2008 | Hsieh | ............................ | 710/110 |
| 2009/0070506 A1 | 3/2009 | Furtner | | |

OTHER PUBLICATIONS

Venkitaram et al., "Symmetric-key Bas IPv6 Addresses," Network Working Group Internet-Draft, Jun. 22, 2006, retrieved from Internet, http://tools.ieft.org/html/draft-narayanan-pba-01.
Atmel, "Atmel's SHA-256 Cryptographic Authentication IC Family Prevents Cloning, Secures Data," Embedded Computing Design, May 1, 2009, Retrieved from Internet URL: http://embedded-computing.com/atmels-cloning-secures-data.
International Preliminary Examining Authority, International Preliminary Report on Patentability for PCT/US2010/036446, Jun. 13, 2011.
PCT International Searching Authority, International Search Report and Written Opinion For PCT/US2010/036446, Jul. 28, 2010.

* cited by examiner

*Primary Examiner* — Glenn A Auve

(57) ABSTRACT

A master/slave data communication system in which a master device communicates with the slave devices by uniquely addressing each of the slave devices. In order to enhance the security of the data communication system, each slave device includes an address generator for generating unique addresses. Periodically, the master device requests that one or more slave device change its address. In response to the request, the addressed slave device increments its address generating algorithm to provide a new slave address. The master device also includes an algorithm that is synchronized with the slave address generating algorithm, whereby when the slave changes its address, it need not transmit the new slave address to the master device over the bus.

21 Claims, 8 Drawing Sheets

DYNAMIC ADDRESS CHANGE FOR SLAVE DEVICES ON A SHARED BUS

BACKGROUND

1. Field of the Invention

The present invention relates generally to master and slave devices communicating on a shared bus, and more particularly to device addressing schemes to provide security to the system.

2. Description of the Related Art

Many computer systems communicate with peripheral devices or other computers using a shared bus to communicate data there between. Such a system is efficient in that a single bus is connected to each device. However, a set of rules or protocol is required in order to provide an orderly data flow so that more than one device does not attempt to use the shared bus at the same time. Often, a master or host device is the dominant computer and controls the communications with the other devices, known as slave devices. With this type of data communication system, the master device determines when to communicate with a slave device, and in response thereto, the slave device responds. The slave devices do not, on their own, initiate communications with the master device.

A well known protocol for providing orderly data communications between a master device and one or more slave devices is the Inter-Integrated Circuit ($I^2C$) technique. The master device is not identified by an address, but all of the slave devices are uniquely identified with respective addresses. The address of each of the slave devices is stored by hardwired means, or in a non-volatile memory that is resident in the slave devices. A two-wire bus connects all of the devices together. When the master device initiates communications with a specific slave device, the address of the slave device is transmitted with a command on the bus during the initiation of the communication. While all of the slave devices will receive the command and the slave address on the bus, only one slave device will find a match with the address, and thus an acknowledgment is sent from the slave device to the master device, whereupon a two-way communication path is established.

The $I^2C$ protocol, as well as other similar bus communication protocols, function to provide data communications on a shared bus between numerous devices. However, the security of such type of communication system can be compromised rather easily. All that is required is that an imposter computer or device be connected to the communication bus and use an active address that is available in the system. In this manner, when the master computer transmits that address on the bus, the imposter can communicate with the master without the master being aware of the same. The data information of the system can thus be made available to the imposter for unauthorized use. Moreover, the imposter device can reply to a request for data and supply false data to the master device which is then processed by the system. Viruses and other data corrupting schemes can be transferred from the imposter device to the master device and thereby corrupt the entire data processing system.

The slave devices need not be sophisticated equipment, but can be simple add-on devices to a host device. By requiring the add-on device to have an address and be coupled to the bus, the existence of a bona fide add-on device can be assured by addressing the same and receiving a response. If the original add-on device is replaced with an imposter device that did not replicate the address of the replaced device, then when addressed, the imposter device cannot respond and the master device is aware of either the removal or inoperability of the original device. More specifically, this technique can be employed with original equipment of a system that is consumable and thus replaceable. If not replaced with the device manufactured by the OEM, then this can be become known and the master device can prevent operation of the system.

From the foregoing, it can thus be seen that a need exists for a technique to afford more security in a shared bus system where the slave devices are uniquely identified. Another need exists for a technique to periodically change the slave device addresses to increase the difficulty for an imposter to communicate with the master device. Yet another need exists for a technique to request that a slave device change its address, but prevent the slave device from communication the new address to the master device, thereby reducing the chances of an imposter learning the new address.

SUMMARY OF THE INVENTION

According to one embodiment of the invention, dynamic address changes for slave devices are employed to provide enhanced security to the system. A master device can request that one or more slave devices change its respective address without transmitting the new address to the slave device during the change address command, and without the slave address transmitting the new slave address to the master device. The master device runs the same address change algorithm as the slave devices, and thus can predict the new slave address.

In one or more disclosed embodiments, each slave device incorporates therein a pseudorandom address generator which can be incremented in response to a change address command from the master device. When an address change is requested by the master, the slave receives the request and increments the pseudorandom address generator to provide a new slave address. The master device, running the same address change algorithm, also increments the address in the algorithm and thus predicts the new slave address.

In one or more disclosed embodiments, each slave device connected to the shared bus system is allocated a range of addresses unique to the respective slave device. To that end, each slave device includes a fixed address portion and a dynamic address portion, where the fixed address portion is unique to the particular slave device. The dynamic address portion is generated by the pseudorandom address generator.

With regard to one embodiment of the invention, disclosed is a data communication system of the type in which a master device communicates over a shared data bus with one or more slave devices, where each slave device is identified by a unique address. The improvement comprises an address generator that is associated with each slave device, and the address generator generates plural addresses so that the address of each slave device can be changed. Each slave device is responsive to a command from the master device for changing the respective address thereof, and the slave device that processes the command controls its address generator to change the address thereof.

In accordance with another embodiment, disclosed is a master/slave data communication system, which includes a shared data bus, a plurality of slave devices connected to the shared bus, and a master device connected to the shared bus. The master device is programmed to communicate with the slave devices by commands. One command programmed in the master device is a change address command, where the command does not include the new address to be changed to. Further included is an address generator associated with each slave device. The address generator generates plural addresses so that the address of each slave device can be changed. Each slave device is responsive to a change address command from the master device for changing the respective address thereof, and the slave device that processes the change address command controls its address generator for changing the address thereof. The slave devices are programmed not to communicate to the master the respective new slave address.

In yet another embodiment of the invention, disclosed is a master/slave data communication system for use in a printer of the type for printing characters on a print medium, and a replaceable container for containing a material that is deposited on the print medium to define the characters. Further included is a data bus, a master device connected to the data bus, and at least one slave device connected to the bus for receiving commands from the master device on the data bus. The slave device is mounted to the replaceable container and carried with the container. The slave device is identified by a unique address. Further included is a means for generating addresses for the slave device so that the slave device is periodically identified by a new address, and the means for generating addresses is located with the slave device and mounted to the replaceable container. The master device is programmed to periodically command the slave device to change its address.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
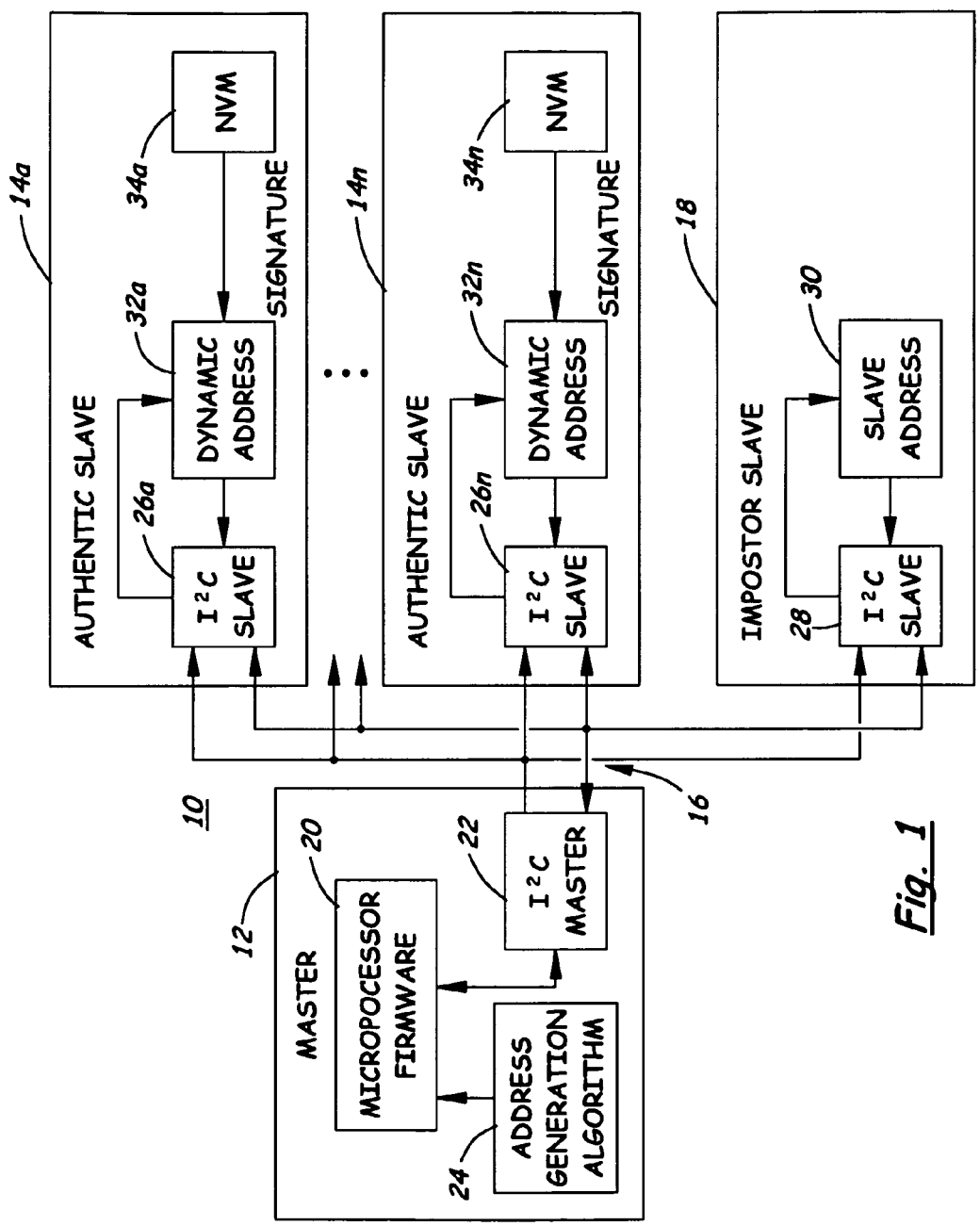
FIG. 1 is a block diagram of a shared data bus system employing a master device communicating with plural slave devices.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof is meant herein to encompass the items listed thereafter and equivalents thereof as well as additional items. Unless otherwise limited, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Furthermore, and as described in subsequent paragraphs, the specific mechanical configurations illustrated in the drawings are intended to exemplify embodiments of the invention and that other alternative mechanical configurations are possible.

FIG. 1 illustrates a shared bus system 10 in which a master device 12 communicates with a number of slave devices, identified by numerals 14a-14n, on a shared bus 16. In the example, an imposter slave device 18 is shown connected to the shared bus 16 in an unauthorized manner. The shared bus system 10 is of the Inter-Integrated Circuit ("I$^2$C") protocol, although many other protocols can be utilized. One wire of the shared bus 16 carries data in a bidirectional manner, and the other wire carries clock signals from the master device 12 to the slave devices 14. Also, while the shared bus 16 is illustrated as a two-wire serial bus, shared parallel bus structures can be utilized with equal effectiveness.

As noted above, when using the I$^2$C protocol, the master device 12 initiates all communications with the respective slave devices 14. The slave devices 14 only respond to the requests of the master device 12. In the event that an imposter is connected to the shared bus 16, and employs a valid slave address, then the imposter device 18 can receive a communication directed to it from the master device 12. When sensitive information is passed on the bus 16 to the slave devices, the imposter device 18 can receive the same in an unauthorized manner, unknown to the master device 12. This can occur if an authorized slave device were to be unplugged from the shared bus 16 and the imposter device plugged therein and programmed or wired to assume the address of the slave device that was unplugged. If the slave devices were all equipped with fixed addresses, which is the established practice, then it is not overly complicated to couple an imposter device to the shared bus 16 and receive sensitive communications in an unauthorized manner and unknown to the master device 12.

In the example of FIG. 1, the master device 12 includes a programmed microprocessor 20 and master I$^2$C circuits 22 controlled by the processor 20. The microprocessor 20 includes a memory for storing the operating program, as well as the software algorithm 24 in which the various slave addresses are predicted. In an embodiment, the slave devices 14 are equipped with pseudorandom address generators in circuit form, but each slave device 14 could operate under programmed instructions including a software algorithm for generating pseudorandom addresses on request by the master device 12. As is conventional with the I$^2$C protocol, the master device 12 issues commands in a known format to the slave that is to respond. The format by which the master device 12 transmits on the shared bus 16 includes start bit, the address of the slave device to respond, and a read or write bit. The master device 12 then waits for receipt of an acknowledgement from the slave device that matches the address transmitted by the master device 12. Once an acknowledgement is received, the master device 12 then transmits a series of data words which are received by the addressed slave device 14. No other slave device can interrupt during the series of transmissions by the master device 12, until the master device 12 releases the bus with a stop bit. After the transmission of each data word, the slave device 14 transmits an acknowledgment of receipt of the data word. If the master device 12 initially transmits a "receive" bit, then in response thereto, the slave device 14 will transmit data words to the master device 12, whereupon the master device 12 will acknowledge receipt of the same after each transmission by the slave device 14. When the master device 12 has received all of the data requested, it will transmit a "not-acknowledge" message to allow the slave device 14 to release the bus 16. As can be seen with the I²C protocol, the master device 12 is in complete control of communications on the shared bus 16. The repertoire of I²C commands is well known to those skilled in the art.

Each slave device 14a-14n, of the example includes an I²C slave circuit 26a-26n, for interfacing the I²C protocol commands with the master device 12. An imposter slave device 18 would also be equipped with an I²C interface circuit 28. In order to intercept information on the shared bus 16, the imposter slave device 18 needs only a simple rudimentary address mechanism 30 in order to be recognized by the master device 12. The imposter address circuit 30 can be a hardwire design, manual switches, or other apparatus for simulating a bona fide slave address. Once a bona fide slave address is found by the imposter slave device 18, it can receive requests from the master device 12 and respond thereto without detection. This is because, traditionally once an address is assigned to a slave device, the authenticity of the slave device is not questioned, even if it is replaced with an imposter device. According in an embodiment, the slave addresses of the shared bus system 10 are periodically changed to thereby thwart attempts by imposters to gain access to the system.

In some embodiments, imposter devices can be detected by requesting that each slave device 14 change its address. Subsequent thereto, the master device 12 can poll each slave device 14 with its previously-assigned address and wait for a response. Because each slave device 14 has changed its address, there should be no response. However, should the master device 12 receive a response on the shared bus 16, the device that responded can be considered an imposter. The system can then take measures to quarantine the imposter or otherwise interrupt system operations until the imposter is found and removed.

The slave devices 14a-14n, of FIG. 1 are equipped with apparatus for dynamically changing the respective addresses upon request by the master device 12. In an embodiment, the master device 12 does not dictate to the slave device 14 what new address should be used, only that the slave device 14 should assign to itself a new address. Each slave device 14a-14n, includes a respective dynamic address circuit or software 32a-32n. The dynamic address apparatus 32 includes a pseudorandom address generator that generates addresses according to a predefined algorithm. In other words, the pseudorandom address generator can be capable of generating a significant number of addresses, but in a highly irregular and unpredictable manner. When embodied in a circuit form, linear feedback shift registers (LFSRs) can be employed, including the Galios type. Other LFSRs can be employed, including a Fibonacci type shift register, and other pseudorandom types of shift registers. Whatever the algorithm of the pseudorandom address generator that is embodied in the slave devices 14, the same algorithm is stored in the memory 24 of the master device 12. Preferably, the slave address generating algorithm is stored in mathematical, table or software instruction form in the memory 24 of the master device 12.

Each slave device 14a-14n, further includes a respective non-volatile memory 34a-34n. The non-volatile memories 34a-34n, store respective default slave addresses and signature addresses to be described in more detail below. In operation, the master device 12 can periodically request that a slave device 14 change its address. This is transmitted by way of a "change address" command on the shared bus 16 in a conventional manner. When the slave device, for example slave device 14a, receives the command and the old slave address matches the address currently provided by the dynamic address generator 32a, then the command is processed by the I²C circuit 26a. When decoded, the address change command causes the dynamic address generator 32a, to be incremented, whereupon a new random address is generated and self-assigned to the slave device 14a. The request is acknowledged by the slave device 14a, to the master device 12, whereupon the master device 12 determines or predicts the newly assigned address by use of the algorithm stored in the memory 24. Thus, both the master device 12 and the slave device 14a, are updated as to the new slave address without transmitting the same on the shared bus 16 to the master device 12. All subsequent transmissions by the master device 12 to the slave device 14a, will be by way of the newly-assigned address. As note above, subsequent to the change of the address of the slave device 14a, the master device 12 can broadcast the old slave device address on the shared bus 16 and wait for a response. If no response is received, then it can be concluded that no imposter using the old address resides on the bus 16.

In the event that the system 10 or a slave device 14 loses power, then the slave address can be reconstructed using the non-volatile memory 34. In this event, the master device 12 can issue a soft reset command to one or more slave devices 14. In response to the request, the slave device 14 will be controlled to read the non-volatile memory and retrieve both a default address and a signature code to be loaded into the linear feedback shift register, or other apparatus functioning as the pseudorandom generator. The slave device 14 will then operate thereafter with the default address until a change of address is requested and carried out.

Figure 2:
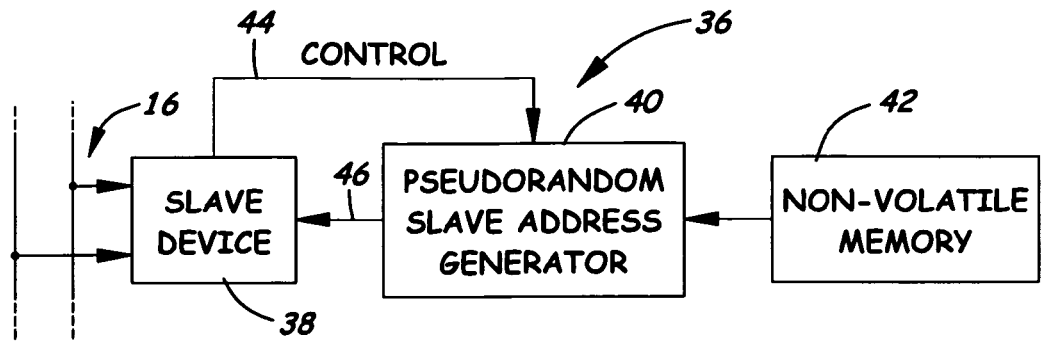
FIG. 2 is a block diagram of a dynamic slave address generator in a slave device.

FIG. 2 illustrates in block diagram form a slave device 36 equipped with a pseudorandom slave address generator 40 in circuit form. The pseudorandom address generator is preferably, although not by way of necessity, a Galios LFSR, or a modified form thereof for generating address bits in a pseudorandom manner. When the slave device 36 receives a change address command over the shared bus 16, the slave I²C circuit 38 decodes the request and controls the address generator 40 by way of control line 44. The line 44 can carry a clock pulse, or other signal, to cause the shift register in the address generator to be incremented. The new slave address is coupled to the I²C circuit 38 by address bus 46. The new address is stable until again changed on request by the master device 12. As described above, the non-volatile memory 42 can store a default address that is used to restore the address generator 40 to the default slave address in response to a soft reset command.

Figure 3:
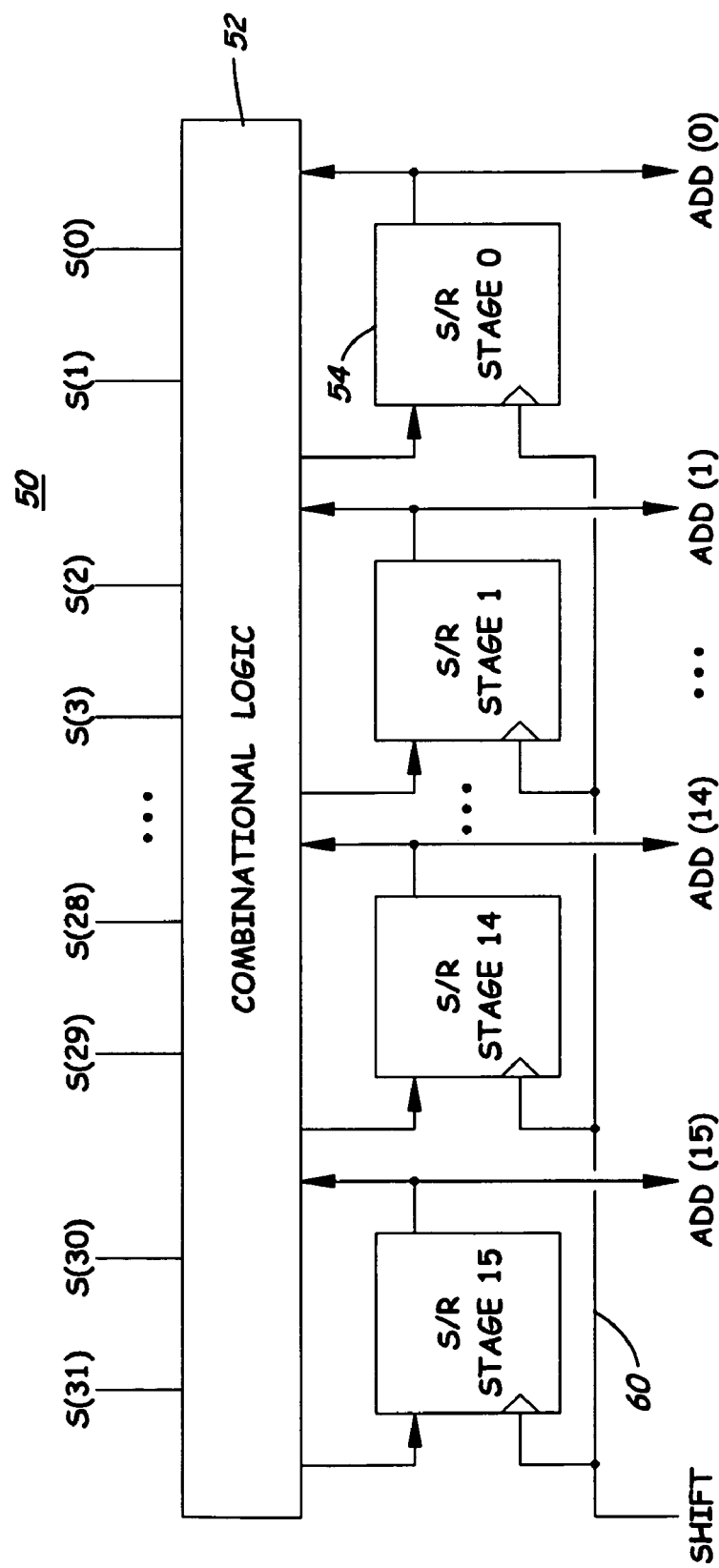
FIG. 3 is an electrical schematic diagram of a pseudorandom address generator in accordance with one embodiment of the invention.

FIG. 3 illustrates a modified Galios linear feedback shift register 50 according to one embodiment of the invention. Here, the linear feedback shift register 50 includes a number of stages 54, one for each slave address bit to be generated. In the preferred embodiment, the address generator 50 produces sixteen address bits Add (0)-Add (15). However, there are thirty-two signature bits S(0)-S(31) input to the LFSR 50. A unique logical combination of the signature and current LFSR bits determine the next state of the LFSR bits and also the selection of sixteen address bits produced. The address of each slave device of the system is different, whereby the pseudorandom address generator behaves differently, even with the same starting default address.

The modified Galios LFSR includes combinational logic 52 associated with each stag, including a multiplexer, logic and an exclusive-or gate. For example, in the first stage 54 of the LFSR 50, the signature bits S(0) and S(1) are input to the combinational logic 52, together with the output of the shift register stage 54, to produce an output coupled back to the input of the shift register 54. As a result, the first slave address bit Add (0) is produced. The other stages of the LFSR 50 are similarly constructed. The clock input of each register 54 is connected together to a SHIFT line 60 and clocked in response to a request to change the slave address. The clocking of the clock input is effective to shift the contents of each register to the subsequent stage, based on the exclusive-or function and logic output of the combinational logic 52. The SHIFT clock pulse on line 60 is generated by the I$^2$C slave circuit 26 in response to the change address command received on the shared bus 16. It is to be noted that the particular type of pseudorandom address generator employed with the invention is not critical, as any type can be employed.

Figure 4:
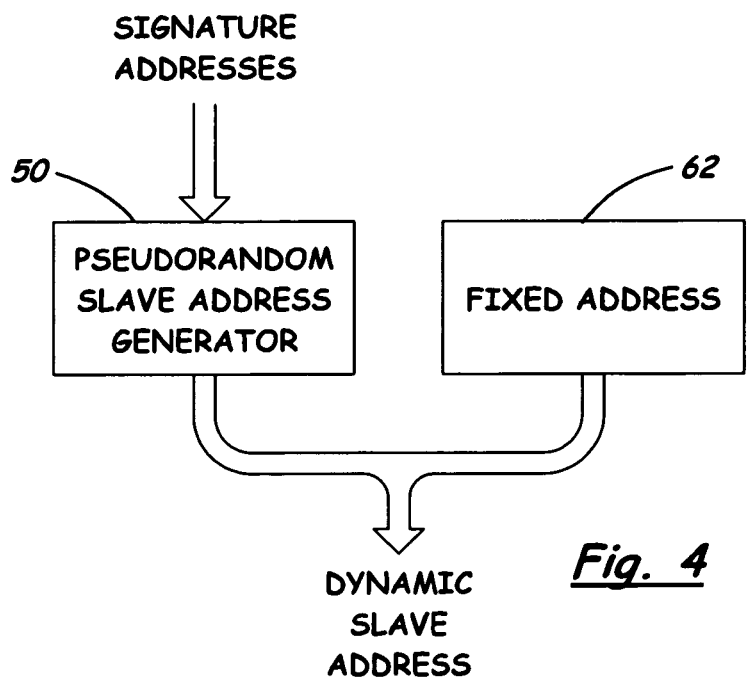
FIG. 4 is a block diagram of a dynamic address generator according to another embodiment of the invention, where the most significant bits are fixed for each slave device.

FIG. 4 illustrates an embodiment of a slave address generator according to another embodiment of the invention. Here, the pseudorandom address generator 50 described above provides the least significant bits of the slave device address, and a fixed address circuit 62 provides a fixed address that is unique to each slave device 14. The fixed address bits of the slave device address constitutes the most significant bits of the address, which may be any number of bits, but generally depends on the number of slave devices expected to be connected to the shared bus 16. In the address generator of FIG. 4, the slave device address can include n LSB bits generated by the pseudorandom slave address generator 50, and m fixed MSB bits provided by the fixed address circuit 62. The fixed address generator 62 can be a hard wired circuit, switches for selecting a desired fixed address, or a wired or programmable logic circuit that provides fixed address bits. In any event, in the preferred embodiment, a 10-bit slave address output from the address generator of FIG. 4 establishes the address of the slave device 14.

Figure 5:
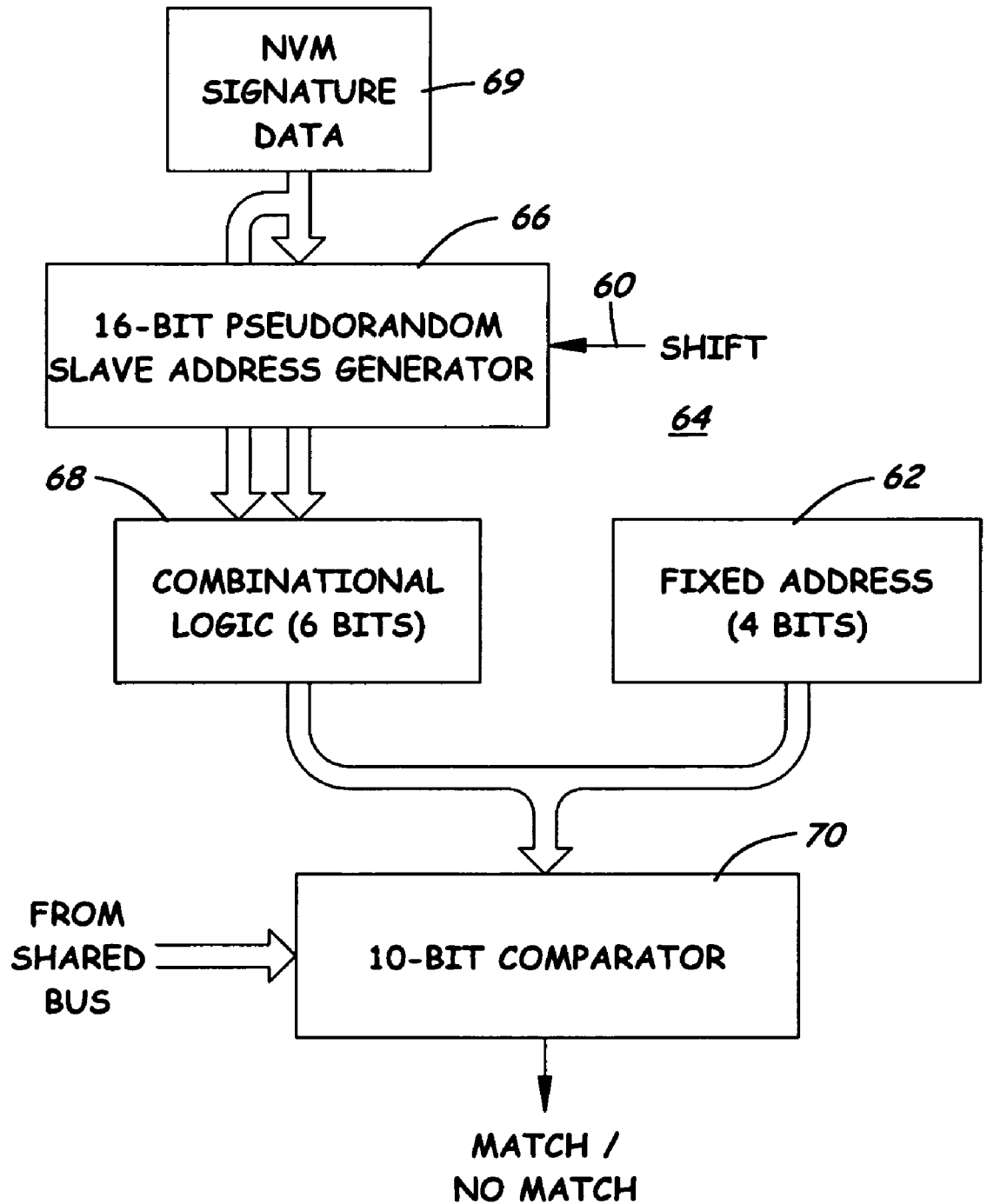
FIG. 5 is a block diagram of the address generating and processing circuits for a slave device.

FIG. 5 illustrates another embodiment of a slave address generator 64. This slave address generator 64 includes a 16-bit pseudorandom address generator 66 that is much like that described above in connection with FIG. 3. A non-volatile memory 69 provides the signature bits to the pseudorandom slave address generator 66 to define the behavior under which the bits are shifted in the shift register portion of the generator 66. The 16-bit output of the pseudorandom address generator 66 and the 32-bit signature data from the non-volatile memory 69 are coupled to a combinational logic circuit 68 to be funneled down to six bits according to the arrangement of the logic gates. The logic circuit 68 can be any type of logic to provide additional complexity and decrease the likelihood that an imposter can guess or otherwise derive the slave device addresses. The logic circuit 68 can, for example, select various bits of the sixteen input bits and the thirty-two bits to arrive at a six-bit output, and then shift or otherwise scramble the bits to provide the six output address bits. Many other schemes of changing the sixteen bit and thirty-two bit inputs to six output bits can be chosen by those skilled in the art.

The six LSB bits from the combinational logic circuit 68, together with the four fixed address bits from the fixed address circuit 62 are coupled together as a single slave address to one 10-bit input of a comparator 70. The other 10-bit input of the comparator 70 has coupled thereto the address bits received in a command on the shared bus 16 from the master device 12. When a command is received on the shared bus 16 with a slave address embedded therein, the I$^2$C circuit 26 of each slave device decodes the address and couples the same to the 10-bit input of the comparator 70. If the address received on the shared bus 16 matches the 10-bit address provided by the slave address generator 64, then the particular slave device 14 can respond according to the command. Of course, only one slave device 14 will respond to the command as each slave device 14 is associated with a unique slave address.

Figure 6:
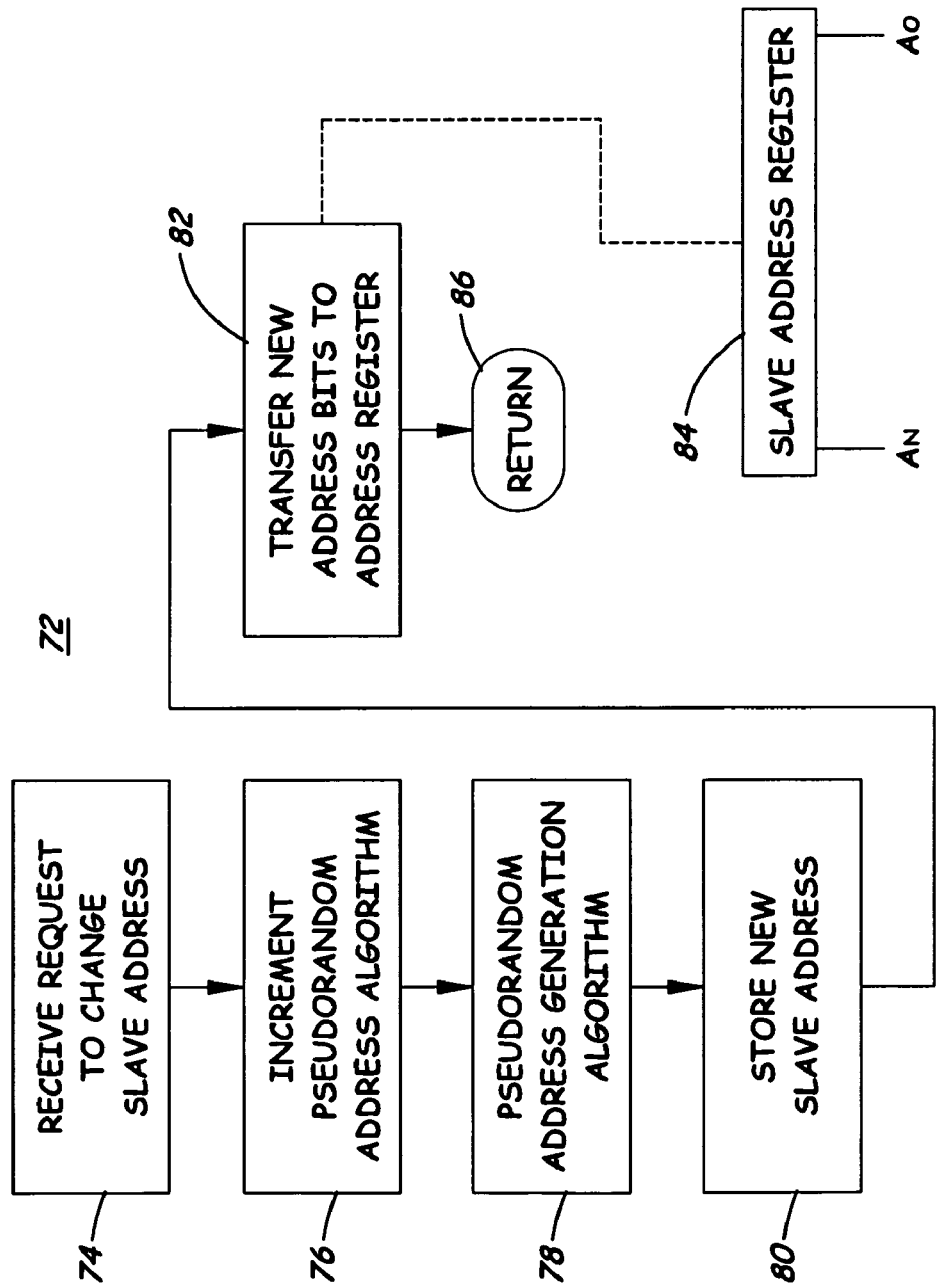
FIG. 6 is a block diagram of a dynamic slave address generator embodied in software.

FIG. 6 illustrates another slave address generation technique 72, which is embodied in software form. The software instructions can be stored in the I$^2$C slave circuit 26, or other programmed logic array, or the like. A slave device 14 receives an address change command directed to it from the master device 12, as shown in block 74. In response to the change address command, the slave device 14 increments or otherwise increases the value in the pseudorandom address generator, as shown by block 76. The pseudorandom address generation algorithm 78 is stored in software. As noted above, the pseudorandom address algorithm can be mathematical in form or a set of instructions that emulate a pseudorandom algorithm. Once the new slave address is generated by the algorithm 78, the new address is stored in memory, as shown by block 80. In addition, and as shown by block 82, the new slave address is transferred to the slave address register 84, which may be in hardware or software form. Lastly, the processing of the slave device 14 returns to the main routine, as shown by block 86. It should be noted that when using this embodiment, the master device 12 can embody the same address generation algorithm in software that is programmed, for example with c-code instructions, so that the master can increment its version of the algorithm at the same time that the slave does, so that both algorithms are synchronized and produce the same address.

Figure 7:
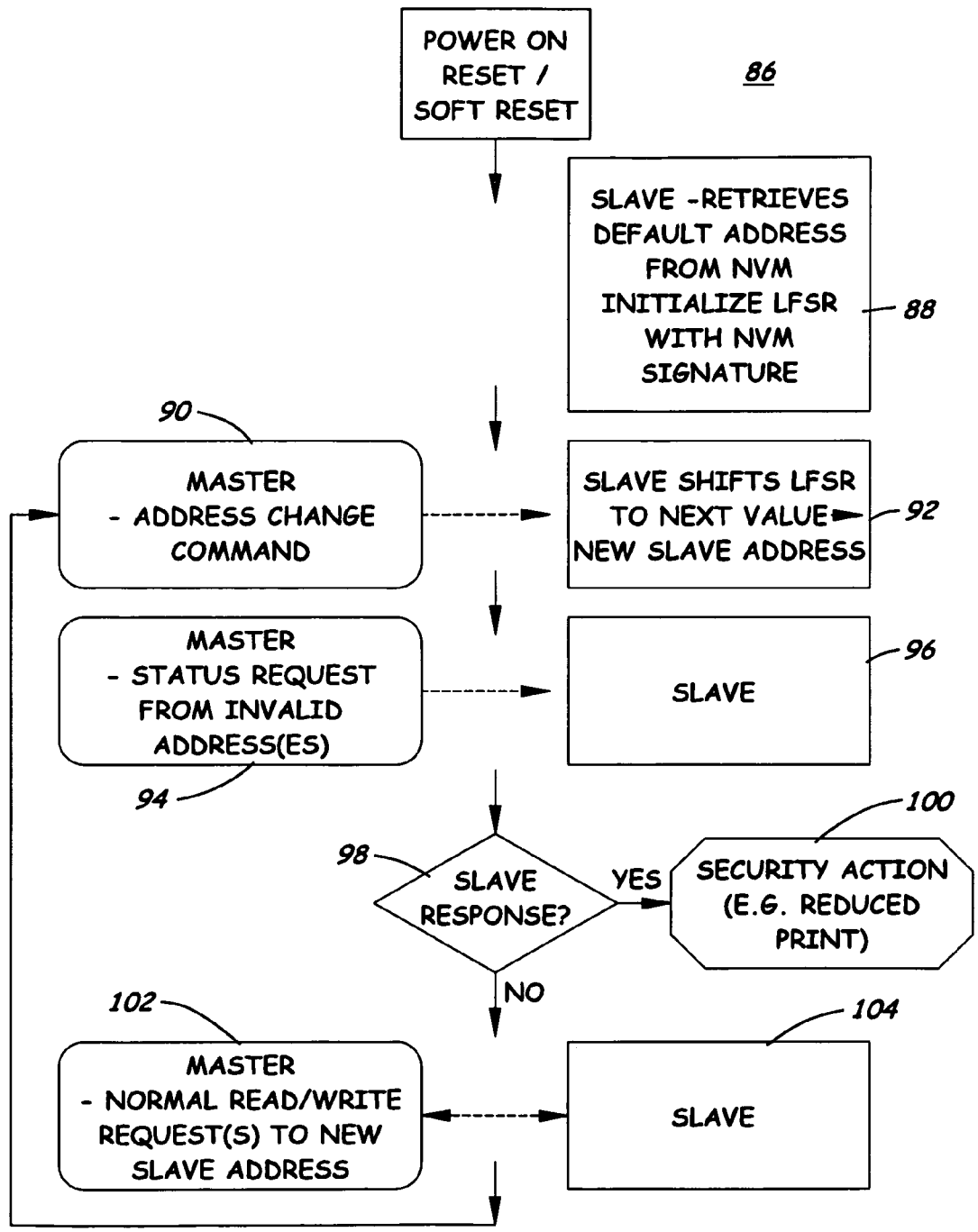
FIG. 7 is a flow chart of the operations in a shared bus system for dynamically changing the address of a slave device.

FIG. 7 is a flowchart of operations carried out in a shared bus system where the slave devices 14 are each identified by a unique address, such as shown in FIG. 1. It is contemplated that in many situations, the slave address generator of the invention may not save the current address by non-volatile means, and thus when power is removed from the slave device, the current slave address is lost. This is to prevent the slave devices from being out of sync if power is lost in the system. As such, the slave address of the slave device 14 and that stored in the master device 12 must be reestablished or resynchronized.

In the event power in the system is lost, then the slave address for each slave device 14 can be reinitialized. This is carried out by using a reinitialize command directed to one or more of the slave devices 14. Since the slave device 14 has lost its address, it can neither accept routine commands from the master device 12, nor respond thereto. The power on reset command is a special command that is accepted by all of the slave devices 14 to reestablish a viable address. FIG. 7 is a flowchart of the process 86 carried out by the system. The flowchart describes the flow of address related commands following a power on reset. In response to a power on reset, the slave device 14 retrieves the default address from the non-volatile memory 69. This is shown by program block 88. Also at this time, the slave device reads the previous LFSR state bits from the non-volatile memory 69 to initialize the linear feedback shift register. The master device 12 can communicate to the slave device 14 using the default address or general call address until an address change command is issued. At some time later, the master device 12 sends an address change command which is illustrated in block 90. In response to the address change command, and as shown by block 92, the slave device 14 shifts the LFSR to the next value to derive a new slave address. The master device 12 then sends a status request of the invalid address(es) on the shared bus 16, as shown by block 94. The slave device 14 may or may not respond, as shown in block 96. In decision block 98, if the slave device 14 responds to the invalid address, security action is undertaken, as shown in block 100. The security action can be of many different types, including shutting down the system, preventing further communications with the slave device that responded but should not have responded, or if the system is a printer, then the print output can be reduced or restricted in some manner. If no slave device responded to the invalid address, then the system can commence normal operations, such as performing a normal read/write request to the new slave address. This is shown in blocks 102 and 104.

The I²C specification includes a "general call" command to which all of the slave devices 14 must respond. In accordance with the practice of the preferred embodiment of the invention, after a change address command is issued by the master device 12 to a slave device 14, and the same is successfully completed, the slave device 14 that experienced the address change is prohibited from responding to the general call command. In this manner, the new address is not placed on the shared bus 16 by the slave device associated with the new address. Only after the master device 12 has issued a status command, can the slave device respond to a general call command.

Figure 8:
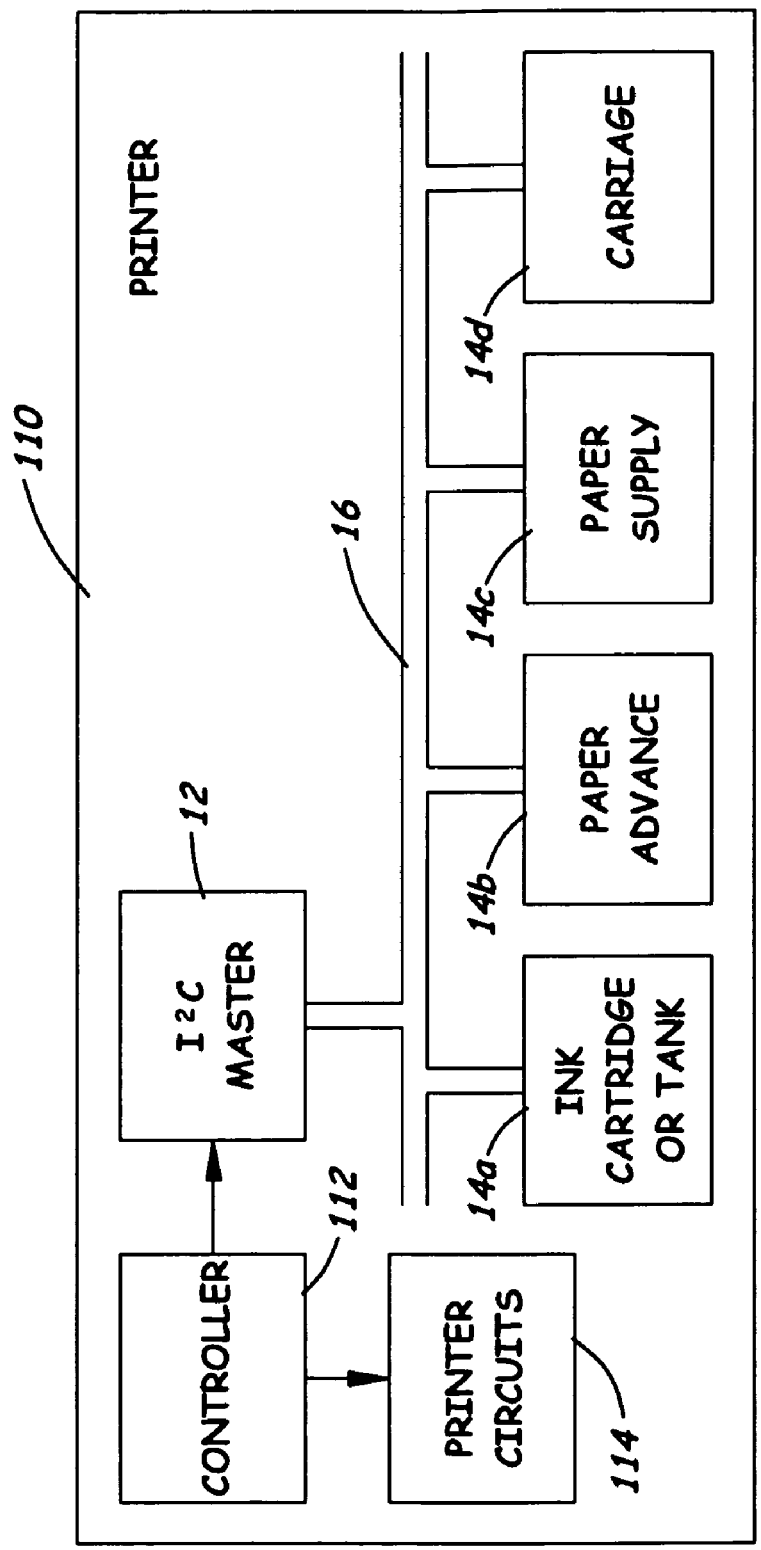
FIG. 8 is a diagram of a printer employing a shared bus system, where the various components of the printer incorporate therein a slave device and associated address generator.

Shared bus systems are employed in many products to control the various subassemblies thereof. Many printers employ shared bus systems having a master and various slave devices located throughout the printer system to control and report on the status of the subassemblies. FIG. 8 illustrates in simplified form a printer 110 of an inkjet type, although other types of printers and products can utilize the features of the invention with equal effectiveness. As is customary, the printer 110 includes a programmed controller 112 for controlling the general operations of a printing process, such as print commands, rasterizing the print data, etc. The controller 112 is generally adapted for controlling other printer circuits and apparatus 114. The controller 112 communicates with the I²C master 12, which communicates with the slave devices 14 over the shared bus 16. The various slave devices 14 can be associated with printer apparatus such as the ink cartridge or ink tank 14a, the paper advance mechanism 14b, paper supply 14c, the carriage 14d, etc. It is envisioned that the slave I²C device 26 would be integrated with the dynamic pseudorandom address circuits on the same chip, and fixed to the printer apparatus to be monitored. When the printer apparatus is installed, or replaced, the electrical contacts of the I²C slave device would make contact with the contacts of the shared bus 16. Thus, the slave I²C circuits are an integral part of the removable printer apparatus.

Print cartridges of the ink and toner types are replaceable by the user of the printer. Liquid ink tanks are also replaceable on printers by the users of the equipment. In an effort to protect the ink cartridges or tanks, the principles and concepts of the invention can employed. This would prevent inks and toner materials which would otherwise damage the printheads and related equipment from being installed in the printer. There exist printer products, such as inks, that are prone to damage the printheads. Thus, it is in the best interest of the longevity of the printer that an authorized cartridge containing an appropriate ink be utilized. Even when using fixed addresses associated with an authorized ink cartridge, such address can be determined and replicated on an unauthorized cartridge that could damage the printhead. However, when utilizing the features of the dynamic address associated with the ink cartridge or tank, the mere copying of the same as a fixed address on a replacement cartridge will be found and the use of the unauthorized cartridge can be stopped before it causes damage. In an embodiment, the controller 112 is programmed to cause the master device 12 to issue an address change command to the slave device 14a, just after installation of a replacement ink cartridge. In this scenario, when the master device 12 requests an address change with respect to the unauthorized ink cartridge, which has a fixed address, the unauthorized ink cartridge will not be able to change the address and the master device 12 will be aware of the same. The printer system 110 can be configured to address such a situation to protect the use of unauthorized ink with the printhead. Other printer accessories and replacement items can be similarly configured with the dynamic address generator of the invention to provide protection against unauthorized replacement.

Figure 9:
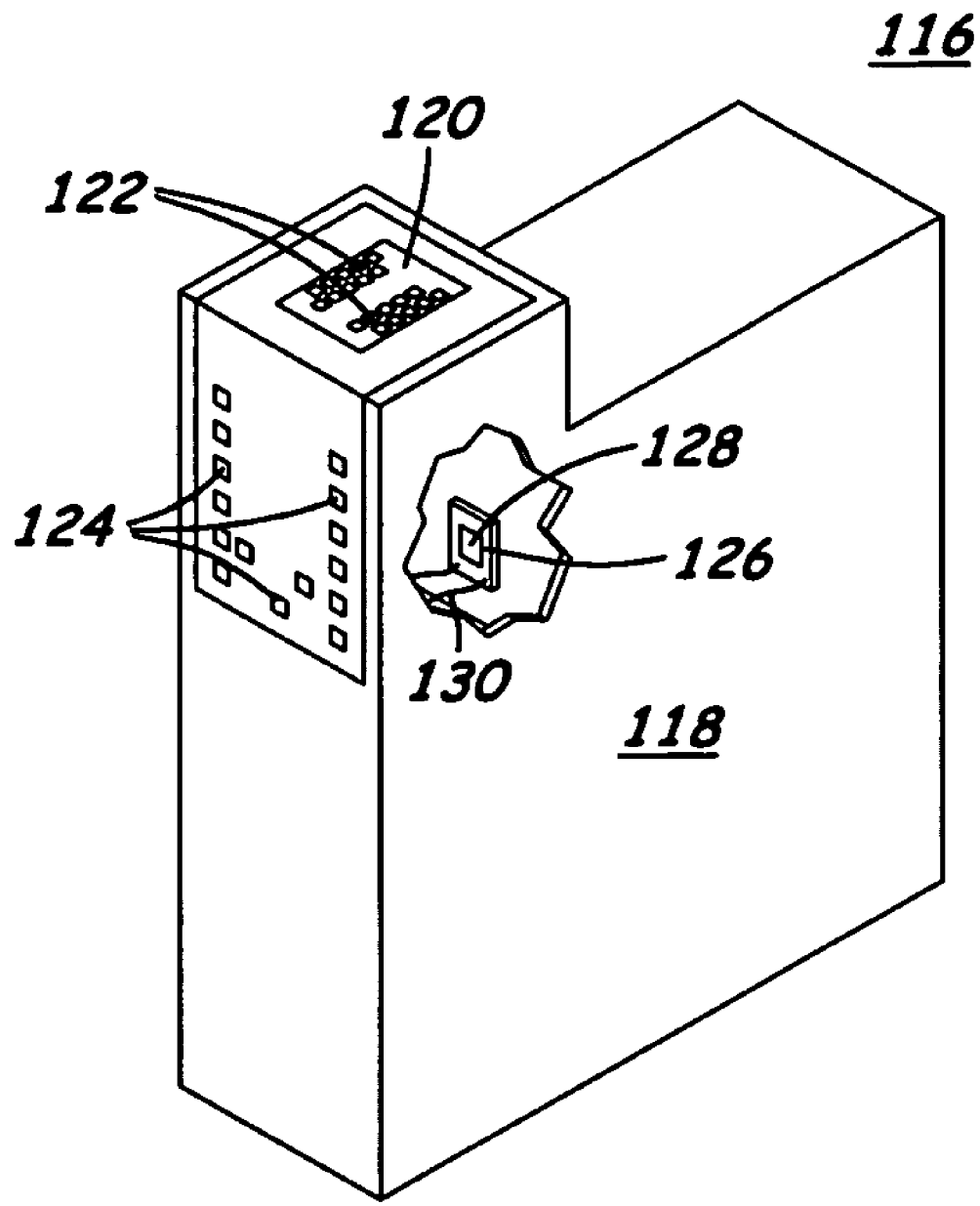
FIG. 9 is an isometric view of an ink cartridge for an ink jet printer, equipped with the slave device and a dynamic address change circuit embodied therein.

FIG. 9 illustrates an ink container 116 or cartridge of the type conventionally used with thermal inkjet printers, and the like. The ink cartridge 116 includes a case 118 and a reservoir therein (not shown) for containing liquid ink, generally of a specific color. The ink cartridge 116 includes a nozzle plate 120 with a plurality of nozzles 122 formed therein through which droplets of ink are jetted onto a print medium. In addition, the ink cartridge 116 includes plural electrical conductor pads 124 for allowing electrical signals to be communicated between a controller and/or a master device to the circuits of the ink cartridge 116. In accordance with an important feature of the invention, the ink cartridge 116 is equipped with a slave device 126 formed integral therewith. The slave device 126 includes I²C circuits 128, including an address generator of one of the types described above, for dynamically changing the address of the slave device 126, and thus the ink cartridge 116, in response to the address change command of the master device 12. The master device 12 is located in the inkjet printer 110 together with the printer controller 112.

From the foregoing, disclosed is a system in which a master device polls one or more slave devices equipped with dynamic slave address generators. On request by the master device, one or more slave devices can change their respective address so that subsequent communications with the master device are with the new address. Importantly, the slave device does not communicate the new address to the master device, which would allow imposters or hackers an opportunity to then gain knowledge of the new address. Rather, the master device operates the same pseudorandom address generating algorithm as the slave devices, so that when the master device requests an address change of the slave device, the master device can also increment its address generating algorithm to arrive at the same address that the slave device assigned to itself by way of its algorithm.

While the preferred embodiment of the invention limits the communication of the new slave address to the respective slave device during the change address process, this is not a requirement to the practice of the invention. Rather, the master device can issue a change address command to the slave device, with the new address being communicated by the master device to the slave device. The slave device would then incorporate or otherwise update the new address in its address generator, which could be a simple software or hardware register. The benefits of dynamically changing the addresses of the respective slave devices can thus be realized.

From the foregoing, the description of the methods and apparatus of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. In a data communication system of the type in which a master device communicates over a shared data bus with one or more slave devices, where each slave device is identified by a unique address, the slave device comprising:
an address generator associated with said slave device, said address generator generating plural addresses so that the address of said slave device can be changed; and
said slave device is responsive to a command from the master device for changing the respective address thereof, and said slave device that processes said command controls its address generator for changing the address thereof, wherein said slave address includes a variable address bit portion and a fixed address bit portion.

2. The slave device of claim 1 wherein each said slave device includes a pseudorandom address generator.

3. The slave device of claim 2 wherein said master device includes an algorithm for deriving the addresses generated by the pseudorandom address generator of each said slave device, whereby the master device can predict a new slave address without transmitting the new slave address from the slave device to the master device.

4. The slave device of claim 1 wherein a value of said fixed address bit portion is unique to said slave device.

5. The slave device of claim 1 wherein the address generator includes a shift register and a non-volatile memory for storing a default address, said default address used to set said shift register with a start address defined by said default address.

6. The slave device of claim 5 wherein said slave device further includes a multiplexer associated with each register of said shift register, and said non-volatile memory stores signature bits applied to said multiplexer for defining a behavior of the shifting of address bits by said shift register.

7. The slave device of claim 6 wherein said address generator further includes combinational logic for processing the address bits output from said shift register to provide a different set of address bits.

8. The slave device of claim 5 wherein said shift register comprises a linear feedback shift register.

9. The slave device of claim 8 wherein said linear feedback shift register comprises a modified Galios linear feedback shift register.

10. The slave device of claim 1 wherein said shared bus comprises an I²C bus protocol.

11. The slave device of claim 10 further including a replaceable container for holding a material that is deposited on a print medium by a printer, and wherein said slave device and associated address generator is mounted to said replaceable container.

12. A master/slave data communication system, comprising:
a shared data bus;
a plurality of slave devices connected to said shared bus;
a master device connected to said shared bus, said master device programmed to communicate with said slave devices by commands, one command programmed in said master device is a change address command, said change address command not including a new address;
an address generator associated with each said slave device, said address generator generating plural addresses so that the address of each said slave device can be changed; and
each said slave device is responsive to a change address command from the master device for changing the respective address thereof, and said slave device that processes said change address command controls its address generator for changing the address thereof; and
said slave devices programmed to not communicate to said master the respective new address, wherein the address of each said slave device comprises a variable address bit portion and a fixed address bit portion, where the fixed address bit portion has a value that is unique to each slave device.

13. The master/slave data communication system of claim 12 wherein said address generator comprises a linear feedback shift register.

14. The master/slave data communication system of claim 12 wherein said master device is programmed with an algorithm that simulates the addresses of the address generator of each said slave device, and said master device is programmed to increment the algorithm when an address change command is transmitted on the bus and acknowledged by the addressed slave device.

15. The master/slave data communication system of claim 12 wherein the master device is programmed to transmit a command on said shared bus, with a slave address in the command that is known to be invalid, whereby if a response is received by the master device, the master device is programmed to consider the response is from an imposter slave device.

16. In a data communication system of the type in which a master device communicates over a shared data bus with one or more slave devices, where each slave device is identified by a unique address, the slave device comprising:
an address generator associated with said slave device, said address generator generating plural addresses so that the address of said slave device can be changed; and
said slave device is responsive to a command from the master device for changing the respective address thereof, and said slave device that processes said command controls its address generator for changing the address thereof,
wherein the address generator includes a shift register and a non-volatile memory for storing a default address, said default address used to set said shift register with a start address defined by said default address.

17. The slave device of claim 16, wherein said address generator further includes a multiplexer associated with each register of said shift register, and said non-volatile memory stores signature bits applied to said multiplexer for defining a behavior of the shifting of address bits by said shift register.

18. The slave device of claim 17, wherein said address generator further includes combinational logic for processing the address bits output from said shift register to provide a different set of address bits.

19. The slave device of claim 16, wherein said shift register comprises a linear feedback shift register.

20. The slave device of claim 19, wherein said linear feedback shift register comprises a modified Galios linear feedback shift register.

21. A master/slave data communication system, comprising:
a shared data bus;
a plurality of slave devices connected to said shared bus;
a master device connected to said shared bus, said master device programmed to communicate with said slave devices by commands, one command programmed in said master device is a change address command, said change address command not including a new address;

an address generator associated with each said slave device, said address generator generating plural addresses so that the address of each said slave device can be changed; and each said slave device is responsive to a change address command from the master device for changing the respective address thereof, and said slave device that processes said change address command controls its address generator for changing the address thereof; and said slave devices programmed to not communicate to said master the respective new address, wherein said address generator comprises a linear feedback shift register.

* * * * *